United States Patent
Shah et al.

(10) Patent No.: US 10,725,671 B2
(45) Date of Patent: Jul. 28, 2020

(54) DUAL INLINE MEMORY PROVISIONING AND RELIABILITY, AVAILABILITY, AND SERVICEABILITY ENABLEMENT BASED ON POST PACKAGE REPAIR HISTORY

(71) Applicant: Dell Products L.P., Round Rock, TX (US)

(72) Inventors: Amit Sumanlal Shah, Austin, TX (US); Ananya Mukherjee, Austin, TX (US); Mark Lawrence Farley, Austin, TX (US); Vadhiraj Sankaranarayanan, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 94 days.

(21) Appl. No.: 16/175,555

(22) Filed: Oct. 30, 2018

(65) Prior Publication Data

US 2020/0133517 A1    Apr. 30, 2020

(51) Int. Cl.
| | |
|---|---|
| *G06F 12/00* | (2006.01) |
| *G06F 13/00* | (2006.01) |
| *G06F 13/28* | (2006.01) |
| *G06F 3/06* | (2006.01) |
| *G06F 9/4401* | (2018.01) |

(52) U.S. Cl.
CPC .......... *G06F 3/0619* (2013.01); *G06F 3/0653* (2013.01); *G06F 3/0679* (2013.01); *G06F 9/4406* (2013.01); *G06F 3/0614* (2013.01)

(58) Field of Classification Search
CPC ..... G06F 3/0614; G06F 3/0619; G06F 3/0653
USPC ........................................................ 711/154
See application file for complete search history.

(56) References Cited

U.S. PATENT DOCUMENTS

| | | | |
|---|---|---|---|
| 2017/0068607 A1* | 3/2017 | Herzi | .................... G06F 11/073 |
| 2017/0123879 A1* | 5/2017 | Donlin | ................ G06F 11/0727 |

* cited by examiner

*Primary Examiner* — Edward J Dudek, Jr.
*Assistant Examiner* — Sidney Li
(74) *Attorney, Agent, or Firm* — Baker Botts L.L.P.

(57) ABSTRACT

An information handling system for DIMM provisioning and RAS enablement may include a memory subsystem that may comprise a DIMM including a set of ranks, each rank of the set of ranks may include a set of DRAMs, each DRAM of the set of DRAMs including a set of rows, and a non-volatile memory associated with the DIMM. The DIMM may include a post package repair (PPR) history including a set of PPR history entries. Each PPR history entry of the set of PPR history entries may include a failed row count for each rank of a corresponding DRAM of the DIMM. The information handling system may also include a BIOS that may determine whether health of the DIMM is unhealthy that may be based on the PPR history. When the health of the DIMM may be unhealthy, the BIOS may also perform a PPR corrective action procedure.

20 Claims, 6 Drawing Sheets

POST PACKAGE REPAIR HISTORY 300

FAILED ROW COUNTS PER RANK 302 OF A SET OF ROWS OF A DIMM

| | RANK 0 # ROWS PPRed 302-0 | RANK 1 # ROWS PPRed 302-1 | RANK 2 # ROWS PPRed 302-2 | RANK 3 # ROWS PPRed 302-3 | RANK 4 # ROWS PPRed 302-4 | RANK 5 # ROWS PPRed 302-5 | RANK 6 # ROWS PPRed 302-6 | RANK 7 # ROWS PPRed 302-7 |
|---|---|---|---|---|---|---|---|---|
| DRAM 0 304-0 | | 2 | | | | 2 | | |
| DRAM 1 304-1 | | | | | | | | |
| DRAM 2 304-2 | | | | | | | | |
| DRAM 3 304-3 | | | | | | | | |
| DRAM 4 304-4 | | | | | | | | |
| DRAM 5 304-5 | | | | | | | | |
| DRAM 6 304-6 | | | 3 | | | | 1 | |
| DRAM 7 304-7 | | | | | | | | |
| DRAM 8 304-8 | | | | | | | 1 | |
| DRAM 9 304-9 | | | | | | | | |
| DRAM 10 304-10 | | | | | | | | |
| DRAM 11 304-11 | | | | | | | | |
| DRAM 12 304-12 | | | | | | | 1 | 2 |
| DRAM 13 304-13 | | | | | | | | |
| DRAM 14 304-14 | | | | | | | | |
| DRAM 15 304-15 | | 1 | | | | | | |
| DRAM 16 304-16 | | | | | | | | |
| DRAM 17 304-17 | | | | | | | | |

PPR HISTORY ENTRIES 304 FOR EACH DRAM OF A DIMM

POST PACKAGE REPAIR HISTORY 300

FAILED ROW COUNTS PER RANK 302 OF A SET OF ROWS OF A DIMM

| | RANK 0 # ROWS PPRed 302-0 | RANK 1 # ROWS PPRed 302-1 | RANK 2 # ROWS PPRed 302-2 | RANK 3 # ROWS PPRed 302-3 | RANK 4 # ROWS PPRed 302-4 | RANK 5 # ROWS PPRed 302-5 | RANK 6 # ROWS PPRed 302-6 | RANK 7 # ROWS PPRed 302-7 |
|---|---|---|---|---|---|---|---|---|
| DRAM 0 304-0 | | | | | | | | |
| DRAM 1 304-1 | | 2 | | | | | | |
| DRAM 2 304-2 | | | | | | | | |
| DRAM 3 304-3 | | | | | | | | |
| DRAM 4 304-4 | | | | | | | | |
| DRAM 5 304-5 | | | | | | 2 | | |
| DRAM 6 304-6 | | | 3 | | | | | |
| DRAM 7 304-7 | | | | | | | | |
| DRAM 8 304-8 | | | | | | | 1 | |
| DRAM 9 304-9 | | | | | | | | |
| DRAM 10 304-10 | | | | | | | 1 | |
| DRAM 11 304-11 | | | | | | | | |
| DRAM 12 304-12 | | | | | | | | 2 |
| DRAM 13 304-13 | | | | | | | 1 | |
| DRAM 14 304-14 | | | | | | | | |
| DRAM 15 304-15 | | 1 | | | | | | |
| DRAM 16 304-16 | | | | | | | | |
| DRAM 17 304-17 | | | | | | | | |

PPR HISTORY ENTRIES 304 FOR EACH DRAM OF A DIMM

FIG. 3A

POST PACKAGE REPAIR HISTORY 301

| | | FAILED ROW COUNTS PER RANK 302 OF A SET OF ROWS OF A DIMM | | | | | | | |
|---|---|---|---|---|---|---|---|---|---|
| | DRAM ID 306 | RANK 0 # ROWS PPRed 302-0 | RANK 1 # ROWS PPRed 302-1 | RANK 2 # ROWS PPRed 302-2 | RANK 3 # ROWS PPRed 302-3 | RANK 4 # ROWS PPRed 302-4 | RANK 5 # ROWS PPRed 302-5 | RANK 6 # ROWS PPRed 302-6 | RANK 7 # ROWS PPRed 302-7 |
| ENTRY 305-0 | DRAM 0 | | 2 | | | | | | |
| ENTRY 305-1 | DRAM 6 | | | 3 | | | | 1 | |
| ENTRY 305-2 | DRAM 8 | | | | | | 2 | 1 | |
| ENTRY 305-3 | DRAM 12 | | 1 | | | | | 1 | 2 |
| ENTRY 305-4 | DRAM 15 | | | | | | | | |

PPR HISTORY ENTRIES 305

DUAL INLINE MEMORY PROVISIONING AND RELIABILITY, AVAILABILITY, AND SERVICEABILITY ENABLEMENT BASED ON POST PACKAGE REPAIR HISTORY

BACKGROUND

Field of the Disclosure

This disclosure relates generally to information handling systems and, more particularly, to dual inline memory module (DIMM) provisioning and reliability, availability, and serviceability (RAS) enablement based on post package repair (PPR) history.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one embodiment, an information handling system may include a memory subsystem. The memory subsystem may include a dual in-line memory module (DIMM). The DIMM may include a set of ranks, each rank of the set of ranks may include a set of dynamic random-access memories (DRAMs), each DRAM of the set of DRAMs including a set of rows. The memory subsystem may also include a non-volatile memory associated with the DIMM that may include a post package repair (PPR) history including a set of PPR history entries. Each PPR history entry of the set of PPR history entries may include a failed row count for each rank of the set of rows of a corresponding DRAM of the DIMM. The information handling system may also include a basic input/output system (BIOS) that may determine whether health of the DIMM is unhealthy that may be based on the failed row count for each rank of the corresponding DRAM of each PPR history entry of the PPR history. When the health of the DIMM may be unhealthy, the BIOS may also perform a PPR corrective action procedure. In one or more embodiments, determining whether health of the DIMM is unhealthy that may be further based on at least one of an age of the DIMM and a rate of failures in time, among others.

In a number of the disclosed embodiments of the information handling system, the performance of the corrective action procedure may further include, when a first failed row count of a first rank of a first DRAM of the set of DRAMs is greater than zero, a second failed row count of the first rank of a second DRAM of the set of DRAMs is greater than zero, and a sum of the first failed row count and the second failed row count exceeds a PPR-repaired threshold, the BIOS may map-out a failing row of the set of rows of the first rank of the first DRAM using a spare row of the first DRAM and map-out a failing row of the set of rows of the first rank of the second DRAM using a spare row of the second DRAM. In a number of the disclosed embodiments of the information handling system, the performance of the corrective action procedure may further include sending a DIMM corrective action message to a user of the information handling system. For example, the BIOS may determine that the DIMM should be replaced. For instance, the DIMM corrective action message may include information that indicates that the DIMM should be replaced.

In a number of the disclosed embodiments of the information handling system, the performance of the corrective action procedure may further include, when a first failed row count of a first rank of a first DRAM of the set of DRAMs is greater than one and a second failed row count of a second rank of the first DRAM is greater than one, the BIOS may map-out a failing row of the set of rows of the first rank of the first DRAM using device tagging.

In a number of the disclosed embodiments of the information handling system, the performance of the corrective action procedure may further include, when a first failed row count of a first rank of a first DRAM of the set of DRAMs is greater than zero and a second failed row count of a second rank of a second DRAM of the set of DRAMs is greater than zero, the BIOS may decrease an operating speed of the DIMM.

In a number of the disclosed embodiments of the information handling system, the performance of the corrective action procedure may further include setting a failure period threshold based on the PPR history. For example, the BIOS may set a failure period threshold based on the PPR history. When a first failure event may occur in a first row of a first rank of the set of rows of a first corresponding DRAM and the first failure event may occur within the failure period threshold of an occurrence of a previous failure event in a second row of the first rank of the set of rows of the first corresponding DRAM, the BIOS may ignore the first failure event.

In a number of the disclosed embodiments of the information handling system, when a first failure event may occur in a first row of a first rank of the set of rows of a first corresponding DRAM, the BIOS may increment the failed row count for the first rank of the set of rows of the first corresponding DRAM.

In a number of the disclosed embodiments of the information handling system, the memory subsystem may also include a serial presence detect (SPD) module that may comprise the non-volatile memory.

In a number of the disclosed embodiments of the information handling system, each PPR history entry of the PPR history further may include a failed DRAM identification of the corresponding DRAM. Each PPR history entry of the set of PPR history entries may have at least one failed row count for each rank of the corresponding DRAM greater than zero.

In a number of the disclosed embodiments of the information handling system, the performance of the corrective action procedure may further include storing an address of a failing row of the set of rows of the rank of the corresponding DRAM. For example, the BIOS may store an address of a failing row of the set of rows of the rank of the corresponding DRAM.

In one or more embodiments, a runtime behavior of the DIMM may be determined. In one example, the runtime behavior of the DIMM may include an operating time of the DIMM. In a second example, the runtime behavior of the DIMM may include a number of failures. In another example, the runtime behavior of the DIMM may include a rate of degradation. For instance, the rate of degradation may be based at least on one or more time stamps. In one or more embodiments, at least one of an operating time of the DIMM, a number of failures, and a rate of degradation may be determined as the runtime behavior of the DIMM. In a number of the disclosed embodiments of the information handling system, the performance of the corrective action procedure may be further based on runtime behavior of the DIMM.

In a number of the disclosed embodiments of the information handling system, the performance of the corrective action procedure may further include the BIOS sending a DIMM corrective action message to a user of the information handling system. The DIMM corrective action message may be based on the PPR history of the DIMM.

In a second embodiment, a disclosed method may include, determining, by a BIOS of the information handling system, whether health of a DIMM of a memory subsystem of an information handling system may be unhealthy that may be based on a PPR history. The DIMM may include a set of ranks, each rank of the set of ranks may include a set of DRAMs, and each DRAM of the set of DRAMs may include a set of rows. The PPR history may be stored at a nonvolatile memory of the memory subsystem associated with the DIMM. The PPR history may include a set of PPR history entries, each PPR history entry of the set of PPR history entries may include a failed row count for each rank of the set of rows of a corresponding DRAM of the DIMM. The method may also include, when the health of the DIMM may be unhealthy, performing, by the BIOS, a PPR correction action procedure.

In a number of the disclosed embodiments of the method, performing the corrective action procedure may further include, when a first failed row count of a first rank of a first DRAM of the set of DRAMs is greater than zero, a second failed row count of the first rank of a second DRAM of the set of DRAMs is greater than zero, and a sum of the first failed row count and the second failed row count exceeds a PPR-repaired threshold, mapping-out a failing row of the set of rows of the first rank of the first DRAM using a spare row of the first DRAM and mapping-out a failing row of the set of rows of the first rank of the second DRAM using a spare row of the second DRAM.

In a number of the disclosed embodiments of the method, performing the corrective action procedure may further include, when a first failed row count of a first rank of a first DRAM of the set of DRAMs is greater than one and a second failed row count of a second rank of the first DRAM is greater than one, mapping-out a failing row of the set of rows of the first rank of the first DRAM using device tagging.

In a number of the disclosed embodiments of the method, performing the corrective action procedure may further include, when a first failed row count of a first rank of a first DRAM of the set of DRAMs is greater than zero and a second failed row count of a second rank of a second DRAM of the set of DRAMs is greater than zero, decreasing an operating speed of the DIMM.

In a number of the disclosed embodiments of the method, performing the corrective action procedure may further include setting a failure period threshold based on the PPR history. The method may also include, when a first failure event may occur in a first row of a first rank of the set of rows of a first corresponding DRAM and the first failure event may occur within the failure period threshold of an occurrence of a previous failure event in a second row of the first rank of the set of rows of the first corresponding DRAM, ignoring the first failure event.

In a number of the disclosed embodiments of the method, the method may also include, when a first failure event occurs in a first row of a first rank of the set of rows of a first corresponding DRAM, incrementing the failed row count for the first rank of the set of rows of the first corresponding DRAM.

In a number of the disclosed embodiments of the method, performing the corrective action procedure may further include storing an address of a failing row of the set of rows of the rank of the corresponding DRAM.

In a number of the disclosed embodiments of the method, performing the corrective action procedure may be further based on runtime behavior of the DIMM. In one example, the runtime behavior of the DIMM may include an operating time of the DIMM. In a second example, the runtime behavior of the DIMM may include a number of failures. In another example, the runtime behavior of the DIMM may include a rate of degradation. For instance, the rate of degradation may be based at least on one or more time stamps. In one or more embodiments, at least one of an operating time of the DIMM, a number of failures, and a rate of degradation may be determined as the runtime behavior of the DIMM.

In a number of the disclosed embodiments of the method, performing the corrective action procedure may further include sending a DIMM corrective action message to a user of the information handling system. The DIMM corrective action message may be based on the PPR history of the DIMM.

BRIEF DESCRIPTION OF THE DRAWINGS

For a more complete understanding of the present invention and its features and advantages, reference is now made to the following description, taken in conjunction with the accompanying drawings, in which.

DESCRIPTION OF PARTICULAR
EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1, 2A, 2B, 3A, 3B, and 4 wherein like numbers are used to indicate like and corresponding parts.

Figure 1:
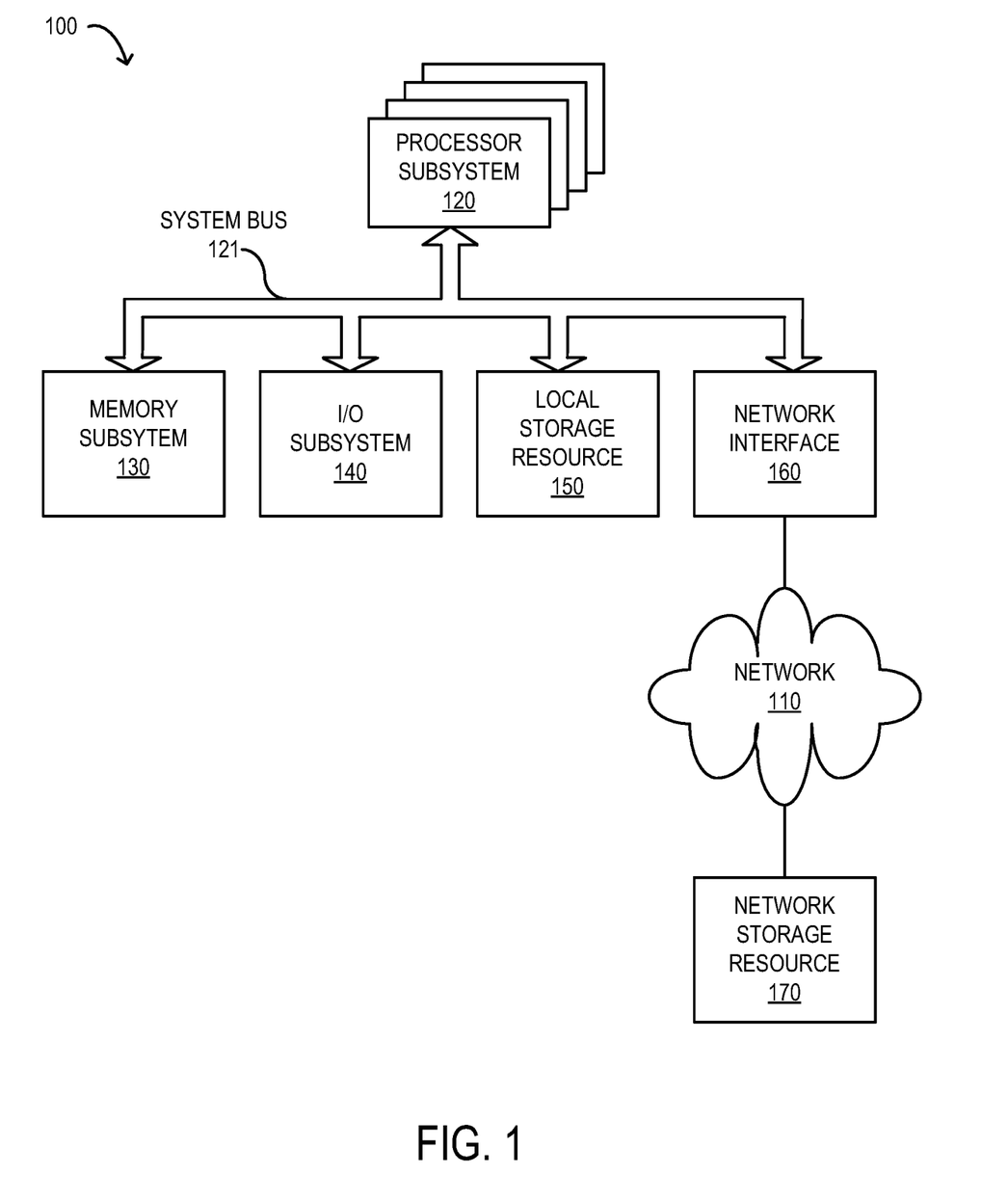
FIG. 1 illustrates an example block diagram depicting selected elements of an example of an information handling system, according to one or more embodiments.

Turning now to the drawings, FIG. 1 illustrates an example block diagram depicting selected elements of an example of an information handling system, according to one or more embodiments. In one or more embodiments, an information handling system (IHS) 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

Typical memory subsystems of an information handling system may include one or more dual in-line memory modules (DIMMs), each DIMM may include one or more dynamic random access memories (DRAMs). In future generations of memory subsystem, the memory failure rates of the DIMMs are expected to increase with decreasing geometries of the DRAMs, increasing channel interface speeds between a CPU and the DIMMs, increasing numbers of memory channels between the CPU and the DIMM, and denser system configurations. In sub 1× nm process nodes, these memory failures are projected to be block-based, multiple rows and/or columns in proximity with each other, rather than isolated cell-based memory failures. Post package repair (PPR) is a joint electron device engineering council (JEDEC) reliability, accessibility, and serviceability (RAS) feature of DDR DRAMs. PPR is utilized to repair faulty rows of DRAMs during boot-time or runtime operation of the information handling system and to reduce the memory failure rates of the DRAMs. However, the current JEDEC standard of PPR only allows 1 spare row per bank-group per rank of a DRAM to be utilized to repairs faulty rows. In addition, current hardware-based heuristics store error history of a DIMM on a serial presence detect (SPD) module such as an error count of DIMM memory failures, a number of times the DIMM has exceeded correctable error (CE) thresholds, and the number of times the DIMM has encountered uncorrectable errors (UEs). The past failure history is typically utilized by operating system (OS) RAS features, such as memory page retire, or other types of OS RAS features. Collecting past failure history of a DIMM at such high-level limits the effectiveness of the OS RAS features.

As will be described in further detail herein, the inventors of the present disclosure have discovered systems and methods for DIMM provisioning and RAS enablement based on PPR history. In this solution, PPR history may be stored at a fine-grained level on a non-volatile memory of a memory subsystem associated with a DIMM of the memory subsystem. This may include storing a failed row count for each rank of a set of rows of a corresponding DRAM of the DIMM for each PPR history entry of the PPR history. This may also include storing a minimum number of bits for the failed row count for each rank of each DRAM. This may result in utilizing the minimum number of bytes to store this information for every rank of each DRAM. During a discovery process in boot-time operation of the information handling system, a basic input/output system (BIOS) (e.g., a BIOS of IHS 100) may determine whether a health of a DIMM may be healthy at a DRAM rank level based on the failed row count for each rank of the corresponding DRAM of each PPR history entry of the PPR history. When the health of the DIMM may be unhealthy, the BIOS may perform a PPR corrective action procedure to repair faulty rows at the DRAM rank level, reduce the memory failure rates of each DRAM of the DIMM, and reliably predict future DRAM behavior based on the accurate PPR history of the DIMM at the hardware level. This results in improved effectiveness of OS RAS features, increased system uptime, reduced costs and time required for debug of DRAM memory failures, and an improved user experience.

Figure 2A:
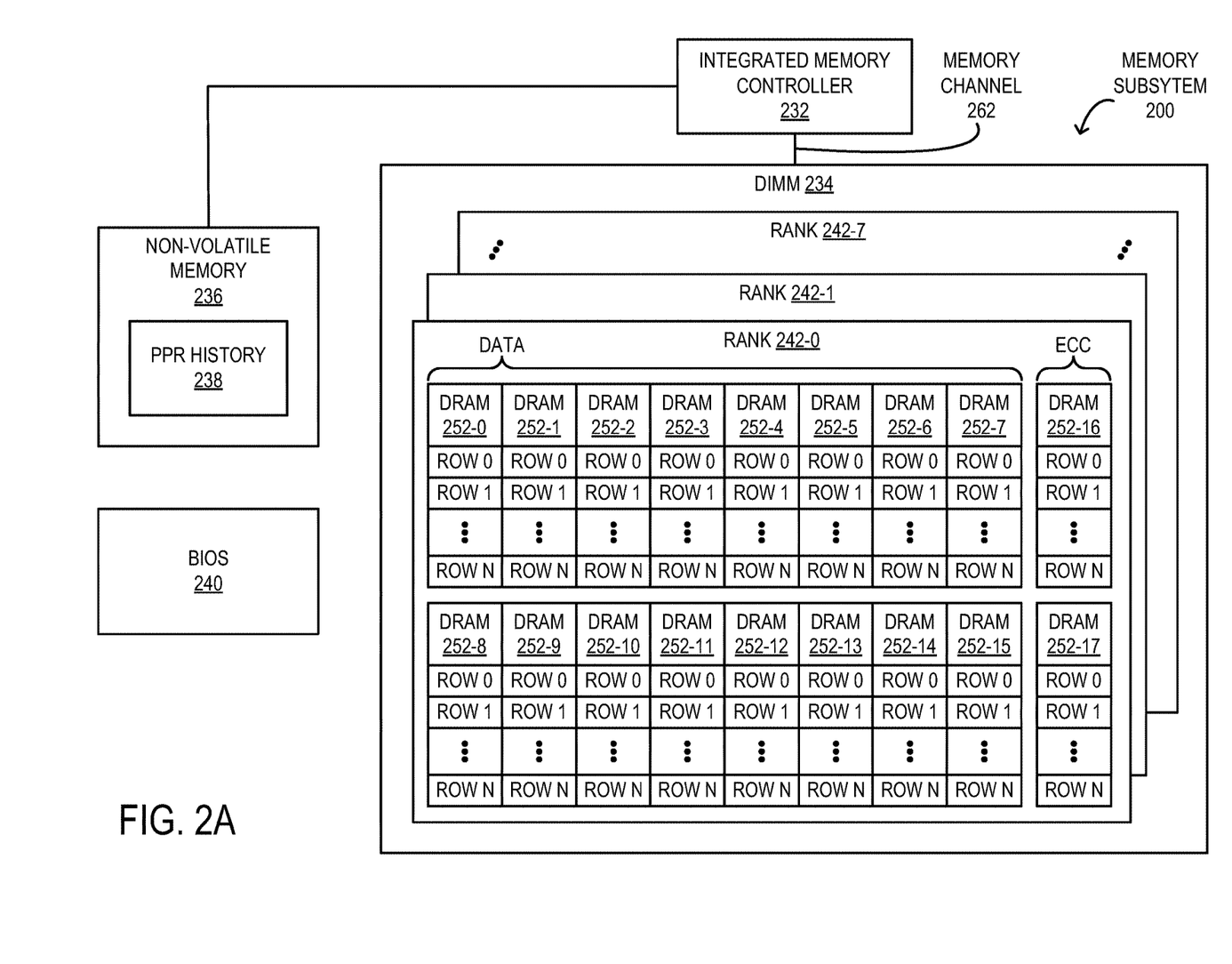
FIGS. 2A and 2B illustrate example block diagrams of selected elements an example of a memory subsystem including post package repair history, according to one or more embodiments.
Figure 2B:
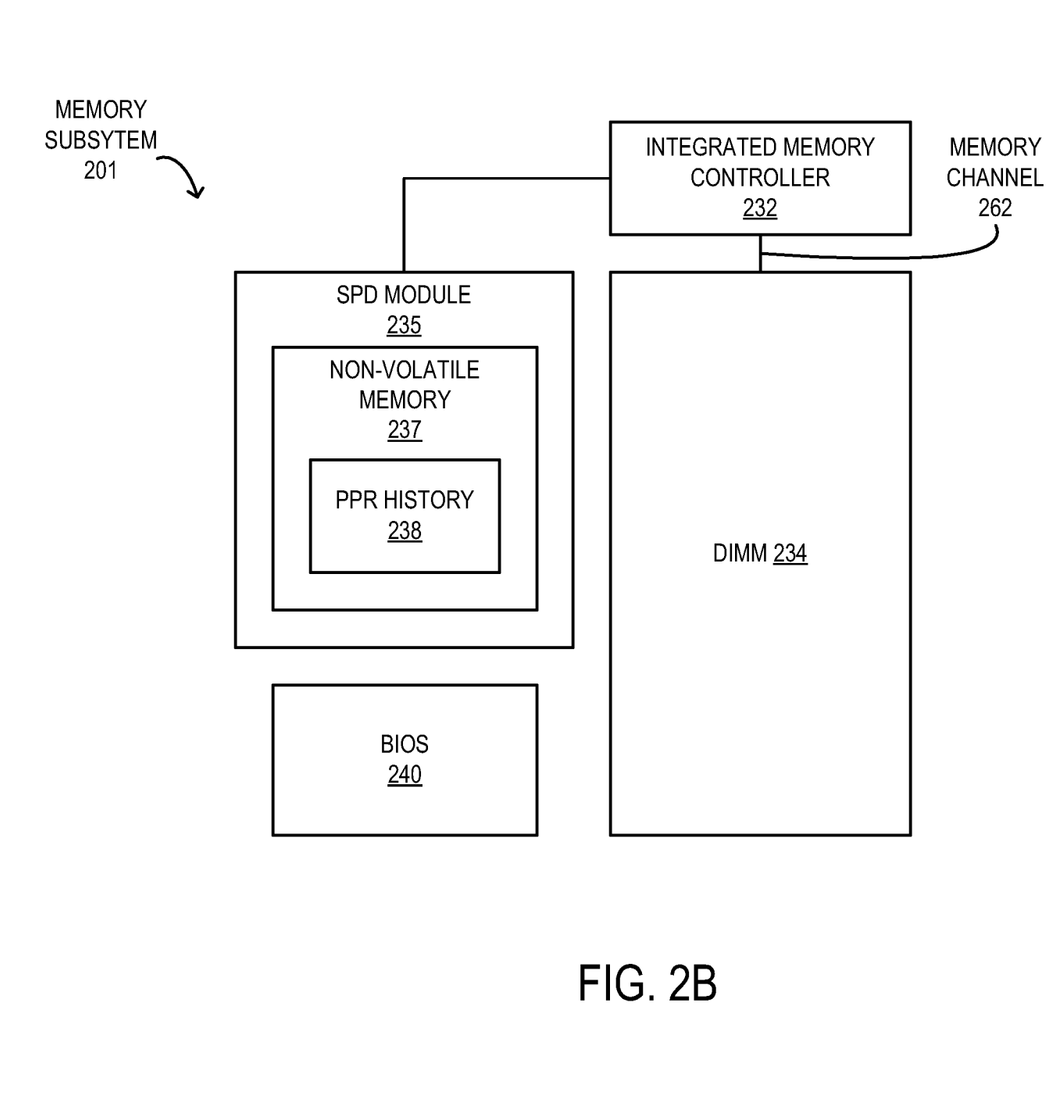

Turning now to FIGS. 2A and 2B, example block diagrams of selected elements an example of a memory subsystem 200 including post package repair history are illustrated, according to one or more embodiments. Memory subsystem 200 may be structurally and functionally similar to memory subsystem 130 as previously described with reference to FIG. 1. In one or more embodiments, memory subsystem 200 may include one or more structures and/or one or more functionalities as those described with reference to memory subsystem 130. As shown in FIG. 2A, components of memory subsystem 200 may include, but are not limited to, an integrated memory controller 232, a DIMM 234, a non-volatile memory 236, a PPR history 238 stored at non-volatile memory 236, a BIOS 240 that may reside in a system memory of memory subsystem 200, and a memory channel 262. Non-volatile memory 236 may be associated with DIMM 234. In one example, DIMM 234 may include non-volatile memory 236. In another example, DIMM 234 may not include non-volatile memory 236. For instance, non-volatile memory 236 may be off part of DIMM 234. Integrated memory controller 232 may be coupled to DIMM 234 by memory channel 262. Integrated memory controller 232 may communicate with DIMM 234 using memory channel 262 through a respective double data rate/double data rate transactional (DDR/DDRT) link.

DIMM 234 may include a set of ranks 242 including rank 242-1, rank 242-2, through rank 242-8. Each rank 242 of the set of ranks 242 may include a set of DRAMs 252 including DRAM 252-1 through DRAM 252-17. Each DRAM 252 may have the same width of bits as each of the other DRAMs 252. In FIG. 2A, DRAMs 252 may comprise a width of 4 bits, a ×4 DRAM, the 16×4 DRAMs 252-1 through 252-15 may comprise 64 bits of data, and the 2×4 DRAMs 252-16 and 252-17 may comprise 8 error correcting code (ECC) bits. Each DRAM 252 may include a set of rows including row 0, row 1 through row N. ECC is a data protection mechanism which recovers single bit errors and some multi-bit errors by accurate detection and correction of corrupted data. As such, DIMM 234 can detect and correct the most common kinds of DRAM memory failures. It will be understood that a DIMM 234 may include a different number of ranks 242, a different number of DRAMs 252, and each DRAM 252 may have a different width than shown in FIG. 2A. For example, DIMM 234 may include 2 ranks 252 and 9 DIMMs 234 each having a width of 8 bits.

In some embodiments, each DRAM 252 may comprise a double data rate (DDR) synchronous dynamic random-access memory (SDRAM) module including a DDR first generation (DDR1) SDRAM, a DDR second generation (DDR2) SDRAM, a DDR third generation (DDR3) SDRAM, a DDR4 SDRAM, a DDR5 SDRAM, or another type of DDR memory.

PPR history 238 may include a set of PPR history entries. Each PPR history entry of the set of PPR history entries may include a failed row count for each rank 242 of the set of rows of a corresponding DRAM 252 of DIMM 234. In one or more embodiments, the number of PPR history entries of PPR history 238 may equal the number of DRAMs 252 of DIMM 234. In one or more other embodiments, each PPR history entry of PPR history 234 may also include a DRAM identification of a corresponding DRAM. Each PPR history entry of PPR history 234 may have at least one failed row count for each rank of the corresponding DRAM greater than zero. By having a PPR history entry for only a corresponding DRAM having at least one failed row count greater than zero, the number of bytes required for PPR history 234 may be substantially reduced rather than a pre-allocation of a PPR history entry for every DRAM 252 of DIMM 234. Other PPR history 234 allocation schemes may be utilized for further memory space reduction.

BIOS 240 may comprise firmware for various hardware management tasks including performing hardware initialization during the booting process, power-on startup, gathering DIMM error data information, providing reliability, availability, and serviceability (RAS) services, and providing runtime services for operating systems and programs.

During operation of memory subsystem 200, when a failure event may occur in a first row of rank 242-0 of the set of rows of a corresponding DRAM 252-0, BIOS 240 may increment the failed row count for rank 242-0 of the set of rows of the corresponding DRAM 252-0. The failure event may comprise a PPR event and the failed row count for rank 242-0 may comprise a post package repaired (PPRed) row count.

During a discovery process in boot-time operation of information handling system 100, BIOS 240 may read PPR history 238 to assess a health of DIMM 234. BIOS 240 may determine whether the health of DIMM 234 is healthy based on the failed row count for each rank 242 of the corresponding DRAM 252 of each PPR history entry of PPR history 234. When BIOS 240 determines that the health of the DIMM may be unhealthy, BIOS 240 may perform a PPR corrective action procedure.

In one or more embodiments, the corrective action procedure may include, when a first failed row count of rank 242-1 of DRAM 252-1 of the set of DRAMs 252 is greater than zero, a second failed row count of rank 242-1 of DRAM 252-2 of the set of DRAMs 252 is greater than zero, and a sum of the first failed row count and the second failed row count exceeds a PPR-repaired threshold, mapping-out a failing row of the set of rows of rank 242-1 of DRAM 252-1 using a spare row of DRAM 252-1 and map-out a failing row of the set of rows of rank 242-1 of DRAM 252-2 using a spare row of DRAM 252-2. For example, when a first failed row count of rank 242-1 of DRAM 252-1 of the set of DRAMs 252 is greater than zero, a second failed row count of rank 242-1 of DRAM 252-2 of the set of DRAMs 252 is greater than zero, and a sum of the first failed row count and the second failed row count exceeds a PPR-repaired threshold, BIOS 240 may map-out a failing row of the set of rows of rank 242-1 of DRAM 252-1 using a spare row of DRAM 252-1 and map-out a failing row of the set of rows of rank 242-1 of DRAM 252-2 using a spare row of DRAM 252-2. The PPR-repaired threshold may be programmable and may be set to an appropriate value. For example, the PPR-repaired threshold may be set to 3 repairs. In one or more embodiments, the failing row of the set of rows of rank 242-1 of DRAM 252-1 and the failing row of the set of rows of rank 242-1 of DRAM 252-2 may each be marked as read-only.

In one or more embodiments, the corrective action procedure may also include, when a first failed row count of rank 242-1 of DRAM 252-1 is greater than one and a second failed row count of rank 242-2 of DRAM 252-1 is greater than one, mapping-out a failing row of the set of rows of rank 242-1 of DRAM 252-1 using device tagging or ADC (SR) during boot-time operation. For example, BIOS 240 may map-out a failing row of the set of rows of rank 242-1 of DRAM 252-1 using device tagging or ADC(SR) during boot-time operation.

In one or more embodiments, the corrective action procedure may further include, when a first failed row count of rank 242-1 of DRAM 252-1 is greater than zero and a second failed row count of rank 242-2 of DRAM 252-2 is greater than zero, decreasing an operating speed of DIMM 234. For example, BIOS 240 may decrease an operating speed of DIMM 234.

In one or more embodiments, the corrective action procedure may also include, when a first failed row count of rank 242-1 of DRAM 252-1 is greater than one and a second failed row count of rank 242-2 of DRAM 252-1 is one, setting a failure period threshold based on PPR history 238. For example, BIOS 240 may set a failure period threshold based on PPR history 238. The failure period threshold may be programmable and may be set to an appropriate value in accordance with the probability of future failure-rate based on PPR history 238. In one or more embodiments, BIOS 240 may correlate PPR history 238 to initial margin results and may make further decisions on DRAM isolation. In one or more embodiments, an interim margin tracking may be utilized to determine a rate of change. In one or more embodiments, a threshold may be determined based at least on a technology node of memory. In one or more embodiments, BIOS 240 may correlate PPR history 238 to initial margin results and may make further decisions on DRAM isolation. In one or more embodiments, a failure threshold may be fixed. In one or more embodiments, a failure threshold may be determined dynamically based at least on measured operating characteristics of memory (e.g., time in field, technology node, etc.). The failure period threshold allows transient burst failures to be filtered if the burst failures occur within the failure period threshold such that the burst of failures are not counted in a failed row count of a rank 242 of a DRAM 252. For example, the failure period threshold may be set to 8 seconds and a transient burst of failures may occur within the 8 second window. In this case, the burst of failures may be due to a temporary voltage regulator (VR) power glitch and may be filtered such that the burst of failures is not counted in the failed row count. When a first failure event may occur in a first row of rank 242-1 of the set of rows of corresponding DRAM 252-1 and the first failure event may occur within the failure period threshold of an occurrence of a previous failure event in a second row of rank 242-1 of the set of rows of DRAM 252-1, BIOS 240 may ignore the first failure event.

In one or more embodiments, the corrective action procedure may also include storing an address of a failing row of the set of rows of a rank 242 of a corresponding DRAM 252. For example, BIOS 240 may store an address of a failing row of the set of rows of a rank 242 of a corresponding DRAM 252. In one or more embodiments, a time stamp associated with the address of the failing row of the set of rows of the rank 242 of the corresponding DRAM 252 may be stored. For example, BIOS 240 may store a time stamp associated with the address of the failing row of the set of rows of the rank 242 of the corresponding DRAM 252. An OS RAS feature may utilize the address of the failing row of the rank 242 of the corresponding DRAM 252 for memory page retirement, memory block retirement, or other types of OS RAS feature procedures. In other embodiments, ranks 242 of DIMM 234 may be subjected to additional stressful training procedures to identify optimal threshold and operating values of DIMM 234.

In one or more embodiments, the corrective action procedure may also include, sending a DIMM corrective action message to a user of information handling system 100. For example, BIOS 240 may send a DIMM corrective action message to a user of information handling system 100. The DIMM corrective action message may be based on PPR history 238 of DIMM 234. The DIMM corrective action message may provide a warning to the user of information handling system 100 such as, for example, reporting that the spare rows of a particular DRAM 252 have all be utilized for repairs and no remaining spare rows exist to proactively replace the particular DRAM 252.

In one or more embodiments, information handling system 100 may utilize the runtime behavior of DIMM 234 in addition to PPR history heuristics for setting DIMM 234 operating speeds, performing BIOS 240 RAS features, performing OS RAS features, and other map-out techniques.

As shown in FIG. 2B, components of memory subsystem 201 may include, but are not limited to, integrated memory controller 232, DIMM 234, a SPD module 235 including non-volatile memory 237, PPR history 238 stored at non-volatile memory 237 of SPD module 235, BIOS 240, and memory channel 262. Memory subsystem 201 may be structurally and functionally similar to memory subsystem 200 described above with reference to FIG. 2A. In one or more embodiments, memory subsystem 201 may include one or more structures and/or one or more functionalities of those described with reference to memory subsystem 200. SPD module 235 is associated with DIMM 234. In one or more embodiments, a difference between memory subsystem 200 and memory subsystem 201 may be that in memory subsystem 200, PPR history 238 may be stored at non-volatile memory 236, and in memory subsystem 201, PPR history 238 may be stored at SPD module 235 within non-volatile memory 237.

Figure 3A:
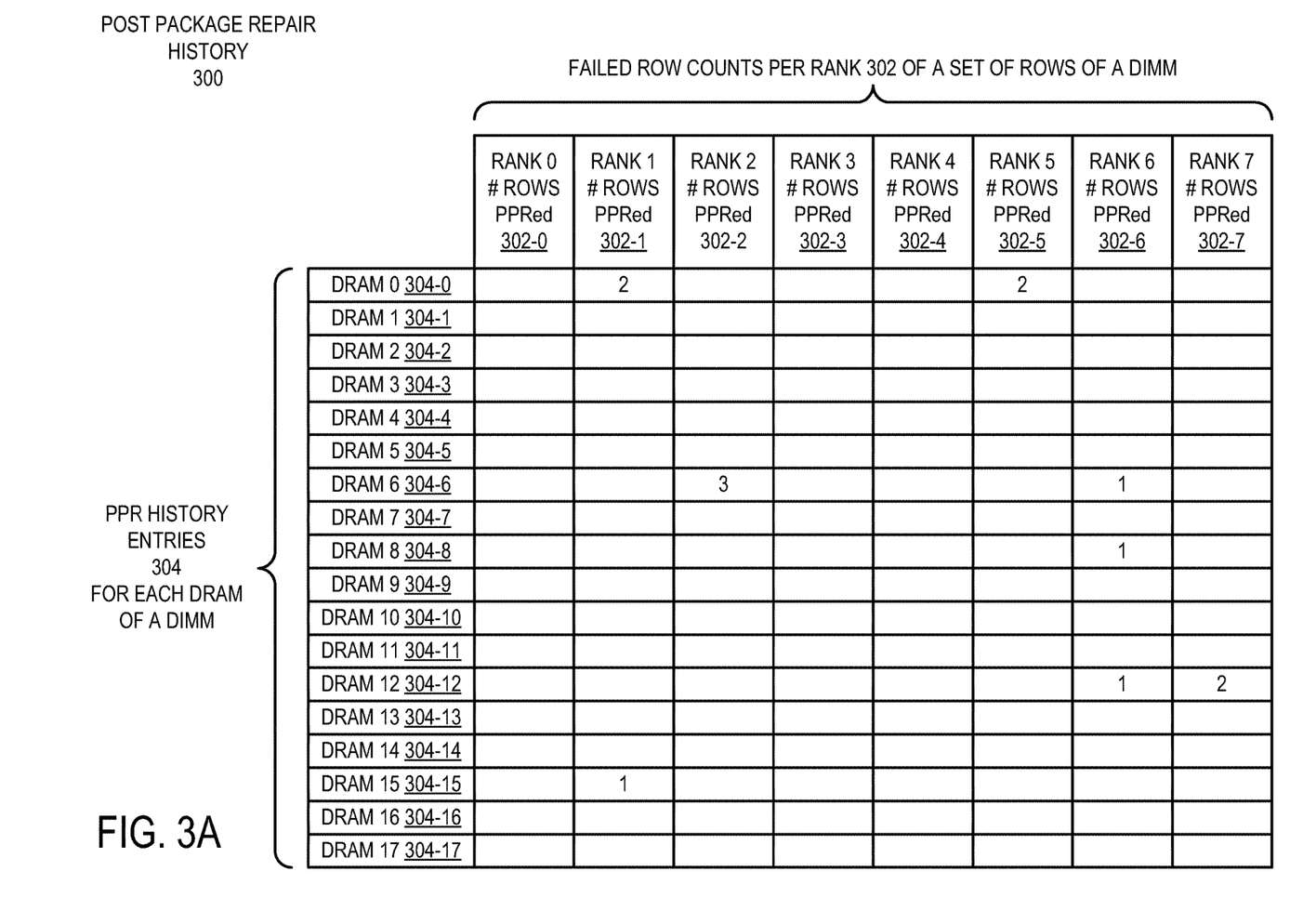
FIG. 3A illustrates an example diagram of selected elements of an example post package repair history, according to one or more embodiments.

Turning now to FIG. 3A, an example diagram of selected elements of an example post package repair history 300 is illustrated, according to one or more embodiments. In one or more embodiments, PPR history 300 may be functionally similar to PPR history 238 described above with reference to FIGS. 2A and 2B. In one or more embodiments, PPR history 300 may include one or more structures and/or one or more functionalities of those described with reference to PPR history 238. As shown in FIG. 3A, components of PPR history 300 may include, but are not limited to, failed row counts for ranks 302 including failed row counts for rank 0 302-0 through failed row counts for rank 7 302-7 of a set of rows of a DIMM 234 and PPR history entries 304 for each DRAM 252 of DIMM 234 including PPR history entry 304-0 for DRAM 0 252-0 through PPR history entry 304-17 for DRAM 17 252-17. It will be understood that the number of ranks may be different than the 8 ranks shown in FIG. 3A and that the number of PPR history entries 304 may also be different than the 18 PPR history entries 304 shown in FIG. 3A, according to one or more embodiments.

As shown in FIG. 3A, PPR history entry 304-0 has a count of two failed rows of failed row count for rank 1 302-1 and a count of two failed rows of failed row count for rank 5 302-5. Similarly, PPR history entry 304-6 has a count of three failed rows of failed row count for rank 2 302-2 and a count of one failed row of failed row count for rank 6 302-6, PPR history entry 304-8 has a count of one failed row of failed row count for rank 6 302-6, PPR history entry 304-12 has a count of one failed row of failed row count for rank 6 302-6 and a count of two failed rows of failed row count for rank 7 302-7, and PPR history entry 304-15 has a count of one failed row of failed row count for rank 1 302-1.

In FIG. 3A, when 2 bits are utilized to store a failed row count for each rank 302 of each DRAM 252, only 2 bytes are needed to store this information for each DRAM 252 having up to 8 ranks. When DIMM 234 includes 18×4 DRAMs 252, PPR history 300 has 18 PPR history entries 304. A total of only 36 bytes are needed to store PPR history 300.

Figure 3B:
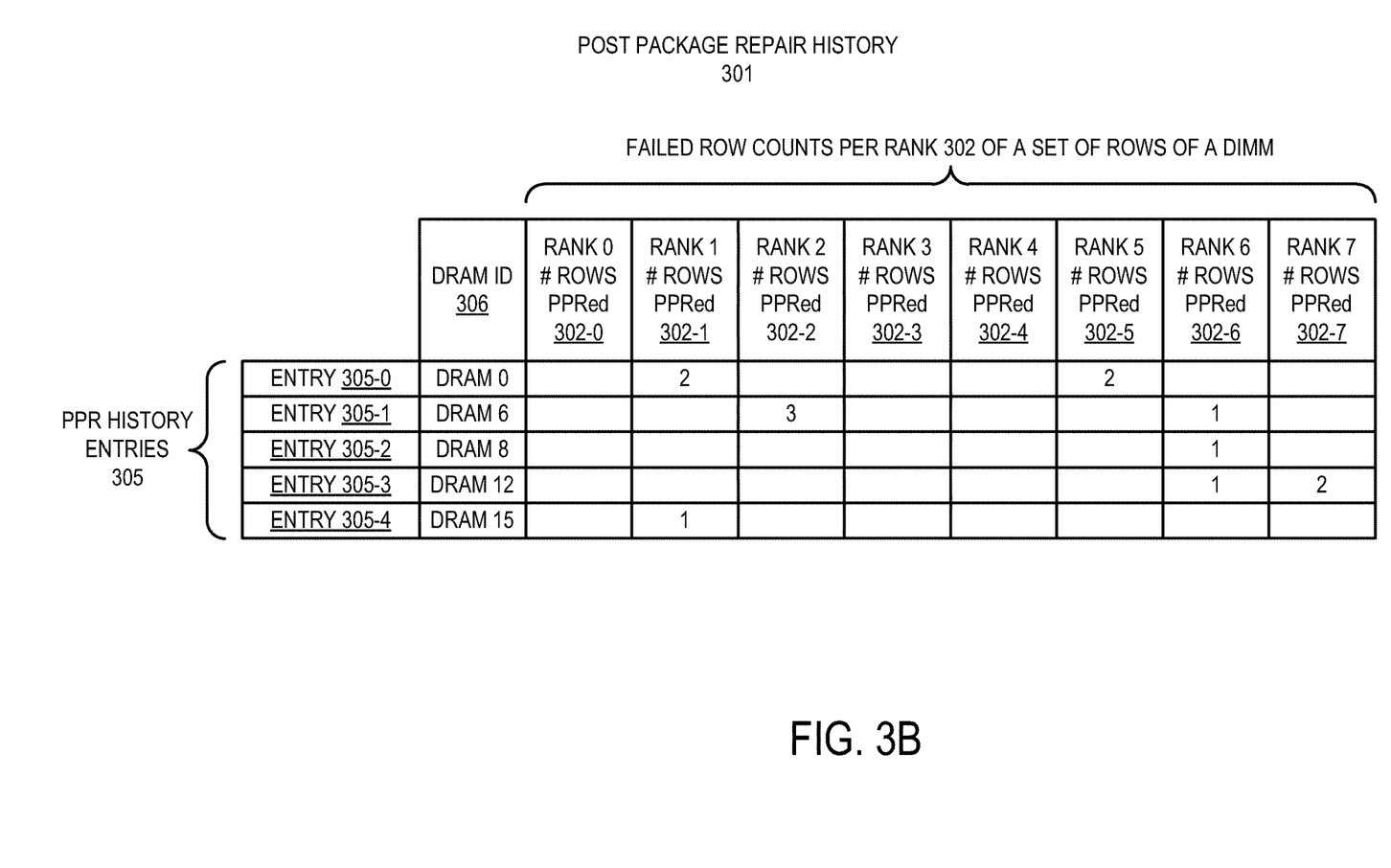
FIG. 3B illustrates another example diagram of selected elements of another example of another post package repair history, according to one or more embodiments.

Turning now to FIG. 3B, an example diagram of selected elements of an example of a PPR history 301 is illustrated, according to one or more embodiments. In one or more embodiments, PPR history 301 may be functionally similar to PPR history 300 described above with reference to FIG. 3A. In one or more embodiments, PPR history 301 may include one or more structures and/or one or more functionalities as those described with reference to PPR history 300. As shown in FIG. 3B, components of PPR history 300 may include, but are not limited to, failed row counts for ranks 302 including failed row counts for rank 0 302-0 through failed row counts for rank 7 302-7 of a set of rows of a DIMM 234, PPR history entries 305 including PPR history entry 305-0 through PPR history entry 305-4, and a DRAM identification (ID) 306 for each corresponding PPR history entry 305. It will be understood that the number of ranks may be different than the 8 ranks shown in FIG. 3B, according to one or more embodiments.

In FIG. 3B, PPR history 301 includes only PPR history entries 305 that have at least one failed row count for each rank 302 of the corresponding DRAM greater than zero. Failed row counts for ranks 302 of PPR history entry 304-0, PPR history entry 304-6, PPR history entry 304-8, PPR history entry 304-12, and PPR history entry 304-15 of PPR history 300 of FIG. 3A correspond to failed row counts for ranks 302 of PPR history entry 305-0, PPR history entry 305-6, PPR history entry 305-8, PPR history entry 305-12, and PPR history entry 305-15 of PPR history 301.

As shown in FIG. 3B, PPR history entry 305-0, PPR history entry 305-6, PPR history entry 305-8, PPR history entry 305-12, and PPR history entry 305-15 each have at least one failed row count for each rank 302 that is greater than zero. DRAM ID 306 is utilized to identify the DRAM 252 corresponding to each PPR history entry 305 of PPR history 301. PPR history entry 305-0 has a DRAM ID 306 set to DRAM 0 corresponding to the failure information associated with DRAM 0. Similarly, PPR history entry 305-1 has a DRAM ID 306 set to DRAM 6, PPR history entry 305-2 has a DRAM ID 306 set to DRAM 8, PPR history entry 305-3 has a DRAM ID 306 set to DRAM 12, and PPR history entry 305-4 has a DRAM ID 306 set to DRAM 15.

In FIG. 3B, a DRAM ID 306 may utilize 5 bits to identify a particular DRAM 252 of 18×4 DRAMs 252, or 8 bits to align the DRAM ID 306 to a byte boundary. When 8 bits are utilized to store a DRAM ID 306 of a PPR history entry 305, only 1 byte is needed to store this information for a PPR history entry. When 2 bits are utilized to store a failed row count for each rank 302 of each DRAM 252, only 2 bytes are needed to store this information for each DRAM 252 having up to 8 ranks. Only 3 bytes are needed to store each PPR history entry 305. Since PPR history 301 has only 5 PPR history entries 305, a total of only 15 bytes are needed to store PPR history 301 and are less than the 36 bytes needed to store PPR history 300.

Figure 4:
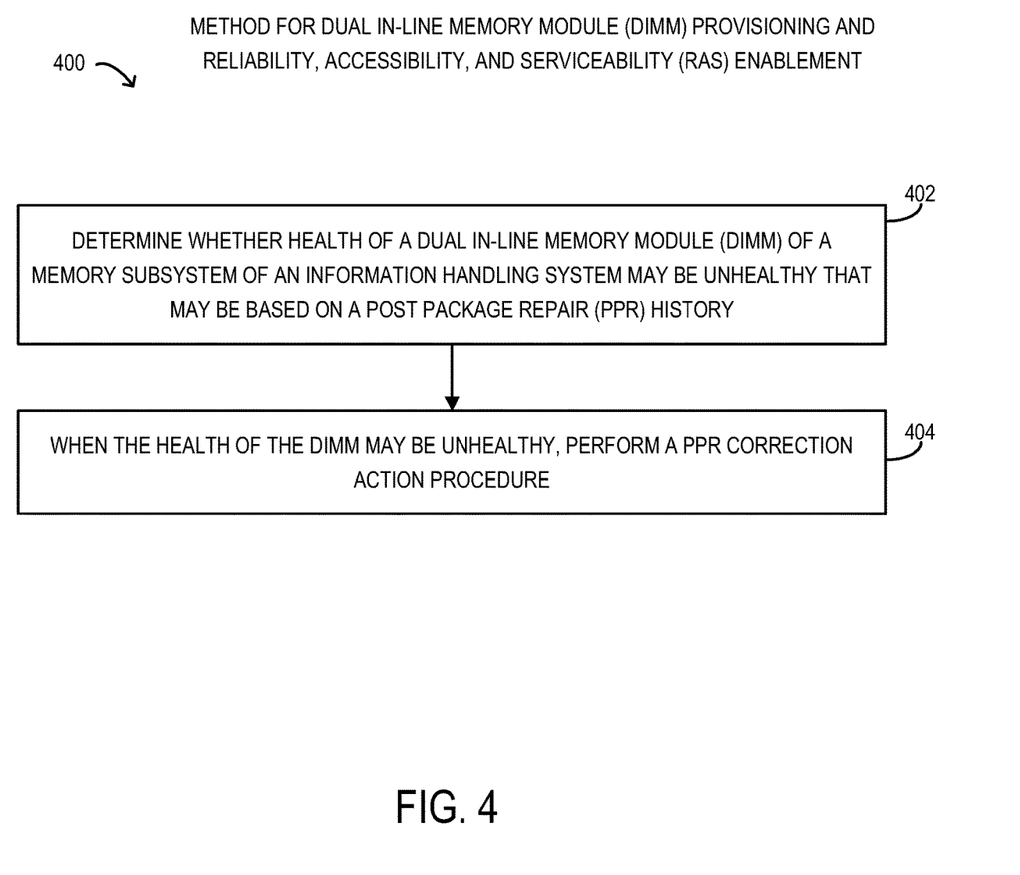
FIG. 4 illustrates an example of a method of provisioning and reliability, accessibility, and serviceability enablement, according to one or more embodiments.

Turning now to FIG. 4, an example of a method 400 of provisioning and reliability, accessibility, and serviceability enablement is illustrated, according to one or more embodiments. In one or more embodiments, method 400 may be performed by information handling system 100, memory controller 130 with reference to FIGS. 1, 2A, and 2B, or another type of information handling system. It is noted that certain operations described in method 400 may be optional or may be rearranged, according to one or more embodiments.

Method 400 may begin at step 402. At step 402, it may be determined whether health of a DIMM of a memory subsystem of an information handling system may be unhealthy that may be based on a PPR history. For example, a BIOS of an information handling system may determine whether health of a DIMM of a memory subsystem of the information handling system may be unhealthy, which may be based on a PPR history. The DIMM may include a set of ranks, each rank of the set of ranks may include a set of DRAMs, and each DRAM of the set of DRAMs may include a set of rows. The PPR history may be stored at a non-volatile memory of the memory subsystem associated with the DIMM. The PPR history may include a set of PPR history entries, each PPR history entry of the set of PPR history entries may include a failed row count for each rank of the set of rows of a corresponding DRAM of the DIMM. At step 404, when the health of the DIMM may be unhealthy, a PPR correction action procedure may be performed. For example, the BIOS may perform a PPR correction action procedure when the health of the DIMM may be unhealthy.

In one or more embodiments, when the health of the DIMM may be unhealthy, a message may be provided to a user (e.g., an administrator of the information handling system). In one example, the message may indicate that that the DIMM may be unhealthy. In another example, the message may include information that indicates to the user that the DIMM should be replaced. In one or more embodiments, when the health of the DIMM is determined to be unhealthy, a message may be provided to a user (e.g., an administrator of the information handling system). In one example, the message may indicate that that the DIMM is unhealthy. In another example, the message may indicate that that the DIMM is associated with at least one issue. In one instance, the at least one issue may include a performance of the DIMM. In another instance, the at least one issue may include a performance of the information handling system. In one or more embodiments, performing the PPR correction action procedure may include sending a DIMM corrective action message to a user (e.g., an administrator of the information handling system) of the information handling system. For example, the DIMM corrective action message may be based at least on the PPR history of the DIMM. For instance, the DIMM corrective action message may include information of the PPR history of the DIMM and/or associated with the PPR history of the DIMM.

In one or more embodiments, one or more of the method and/or process elements and/or one or more portions of a method and/or processor elements may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An information handling system, comprising:
a memory subsystem including:
  a dual in-line memory module (DIMM) comprising:
    a set of ranks, each rank of the set of ranks including a set of dynamic random-access memories (DRAMs), each DRAM of the set of DRAMs including a set of rows; and
  a non-volatile memory associated with the DIMM comprising:
    a post package repair (PPR) history including a set of PPR history entries, each PPR history entry of the set of PPR history entries comprising:
      a failed row count for each rank of the set of rows of a corresponding DRAM of the DIMM; and
a basic input/output system (BIOS) configured to:

determine whether health of the DIMM is unhealthy based on the failed row count for each rank of the corresponding DRAM of each PPR history entry of the PPR history; and when the health of the DIMM is unhealthy, perform a PPR corrective action procedure.

2. The information handling system of claim 1, wherein, to perform the PPR corrective action procedure, the BIOS is further configured to:

when a first failed row count of a first rank of a first DRAM of the set of DRAMs is greater than zero, a second failed row count of the first rank of a second DRAM of the set of DRAMs is greater than zero, and a sum of the first failed row count and the second failed row count exceeds a PPR-repaired threshold:

map-out a failing row of the set of rows of the first rank of the first DRAM using a spare row of the first DRAM; and map-out a failing row of the set of rows of the first rank of the second DRAM using a spare row of the second DRAM.

3. The information handling system of claim 1, wherein, to perform the PPR corrective action procedure, the BIOS is further configured to:

when a first failed row count of a first rank of a first DRAM of the set of DRAMs is greater than one and a second failed row count of a second rank of the first DRAM is greater than one:

map-out a failing row of the set of rows of the first rank of the first DRAM using device tagging.

4. The information handling system of claim 1, wherein, to perform the PPR corrective action procedure, the BIOS is further configured to:

when a first failed row count of a first rank of a first DRAM of the set of DRAMs is greater than zero and a second failed row count of a second rank of a second DRAM of the set of DRAMs is greater than zero:

decrease an operating speed of the DIMM.

5. The information handling system of claim 1, wherein, to perform the PPR corrective action procedure, the BIOS is further configured to:

set a failure period threshold based on the PPR history, and wherein when a first failure event occurs in a first row of a first rank of the set of rows of a first corresponding DRAM and the first failure event occurs within the failure period threshold of an occurrence of a previous failure event in a second row of the first rank of the set of rows of the first corresponding DRAM, ignore the first failure event.

6. The information handling system of claim 1, wherein, when a first failure event occurs in a first row of a first rank of the set of rows of a first corresponding DRAM, increment the failed row count for the first rank of the set of rows of the first corresponding DRAM.

7. The information handling system of claim 1, wherein the memory subsystem further comprising a serial presence detect (SPD) module including the non-volatile memory.

8. The information handling system of claim 1, wherein each PPR history entry of the PPR history further comprises a failed DRAM identification of the corresponding DRAM, and wherein each PPR history entry of the set of PPR history entries has at least one failed row count for each rank of the corresponding DRAM greater than zero.

9. The information handling system of claim 1, wherein, to perform the PPR corrective action procedure, the BIOS is further configured to store an address of a failing row of the set of rows of the rank of the corresponding DRAM.

10. The information handling system of claim 1, wherein the BIOS is further configured to: determine a runtime behavior of the DIMM, wherein the runtime behavior of the DIMM includes at least one of an operating time of the DIMM, a number of failures, and a rate of degradation; and perform the PPR corrective action procedure based at least on the runtime behavior of the DIMM.

11. The information handling system of claim 1, wherein, to perform the PPR corrective action procedure, the BIOS is further configured to send a DIMM corrective action message to a user of the information handling system, wherein the DIMM corrective action message based on the PPR history of the DIMM and indicates that the DIMM should be replaced.

12. A method, comprising:

determining, by a basic input/output system (BIOS) of the information handling system, whether health of a dual in-line memory module (DIMM) of a memory subsystem of an information handling system is unhealthy based on a post package repair (PPR) history, wherein the DIMM comprising a set of ranks, each rank of the set of ranks including a set of dynamic random-access memories (DRAMs), each dynamic random-access memory (DRAM) of the set of DRAMs including a set of rows, and wherein the PPR history stored at a non-volatile memory of the memory subsystem associated with the DIMM and including a set of PPR history entries, each PPR history entry of the set of PPR history entries comprising a failed row count for each rank of the set of rows of a corresponding DRAM of the DIMM; and when the health of the DIMM is unhealthy, performing, by the BIOS, a PPR correction action procedure.

13. The method of claim 12, wherein the performing the corrective action procedure comprises:

when a first failed row count of a first rank of a first DRAM of the set of DRAMs is greater than zero, a second failed row count of the first rank of a second DRAM of the set of DRAMs is greater than zero, and a sum of the first failed row count and the second failed row count exceeds a PPR-repaired threshold:

mapping-out a failing row of the set of rows of the first rank of the first DRAM using a spare row of the first DRAM; and mapping-out a failing row of the set of rows of the first rank of the second DRAM using a spare row of the second DRAM.

14. The method of claim 13, wherein the performing the corrective action procedure further comprises:

when a first failed row count of a first rank of a first DRAM of the set of DRAMs is greater than one and a second failed row count of a second rank of the first DRAM is greater than one:

mapping-out a failing row of the set of rows of the first rank of the first DRAM using device tagging.

15. The method of claim 13, wherein the performing the corrective action procedure further comprises:

when a first failed row count of a first rank of a first DRAM of the set of DRAMs is greater than zero and a second failed row count of a second rank of a second DRAM of the set of DRAMs is greater than zero:

decreasing an operating speed of the DIMM.

16. The method of claim 13, wherein the performing the corrective action procedure further comprises:

setting a failure period threshold based on the PPR history; and when a first failure event occurs in a first row of a first rank of the set of rows of a first corresponding DRAM and the first failure event occurs within the failure period threshold of an occurrence of a previous failure event in a second row of the first rank of the set of rows of the first corresponding DRAM, ignoring the first failure event.

17. The method of claim 13, further comprising:
when a first failure event occurs in a first row of a first rank of the set of rows of a first corresponding DRAM, incrementing the failed row count for the first rank of the set of rows of the first corresponding DRAM.

18. The method of claim 13, wherein the performing the corrective action procedure further comprises storing an address of a failing row of the set of rows of the rank of the corresponding DRAM and storing a time stamp associated with the address of the failing row of the set of rows of the rank of the corresponding DRAM.

19. The method of claim 13, further comprising:
determining a runtime behavior of the DIMM, wherein the runtime behavior of the DIMM includes at least one of an operating time of the DIMM, a number of failures, and a rate of degradation;
wherein the performing the corrective action procedure is based at least on the runtime behavior of the DIMM.

20. The method of claim 13, wherein the performing the corrective action procedure further comprises sending a DIMM corrective action message to a user of the information handling system, wherein the DIMM corrective action message based on the PPR history of the DIMM.

* * * * *